(12) United States Patent
Ayabe et al.

(10) Patent No.: US 11,909,930 B2
(45) Date of Patent: Feb. 20, 2024

(54) PROCESSING APPARATUS INCLUDING A MOUNT ON WHICH AN OBJECT IS PLACED, AND IMAGE FORMING APPARATUS

(71) Applicant: FUJIFILM CORPORATION, Tokyo (JP)

(72) Inventors: Takuma Ayabe, Kanagawa (JP); Tsutomu Shiihara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/047,651

(22) Filed: Oct. 19, 2022

(65) Prior Publication Data
US 2023/0319201 A1 Oct. 5, 2023

(30) Foreign Application Priority Data
Mar. 31, 2022 (JP) ................................. 2022-060845

(51) Int. Cl.
*H04N 1/12* (2006.01)
*H04N 1/00* (2006.01)

(52) U.S. Cl.
CPC ..... *H04N 1/00559* (2013.01); *H04N 1/00408* (2013.01); *H04N 1/00824* (2013.01)

(58) Field of Classification Search
CPC .......... H04N 1/00559; H04N 1/00408; H04N 1/00824
See application file for complete search history.

(56) References Cited

U.S. PATENT DOCUMENTS

| | | | |
|---|---|---|---|
| 2007/0091554 A1* | 4/2007 | Uchizono | F16M 11/10 248/917 |
| 2014/0233162 A1* | 8/2014 | Katsuyama | H04N 1/0035 361/679.01 |
| 2018/0270365 A1* | 9/2018 | Ishida | H04N 1/00559 |

FOREIGN PATENT DOCUMENTS

| | | |
|---|---|---|
| JP | 2016-052457 A | 4/2016 |
| JP | 2018-155260 A | 10/2018 |

* cited by examiner

*Primary Examiner* — Moustapha Diaby
(74) *Attorney, Agent, or Firm* — SOLARIS Intellectual Property Group, PLLC

(57) ABSTRACT

A processing apparatus includes a mount on which an object is placed and a support member that is provided on an upper surface of the mount and that supports a supported unit that provides at least one of an operation and a display regarding a process, the support member including a protruding portion that protrudes outward at a lower end of the support member and having a rod shape formed by joining plural members adjacent to each other in a direction along the upper surface, the protruding portion being embedded below the upper surface.

17 Claims, 9 Drawing Sheets

FIG. 9
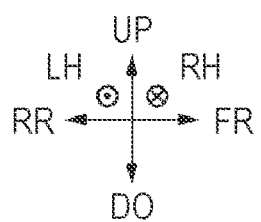
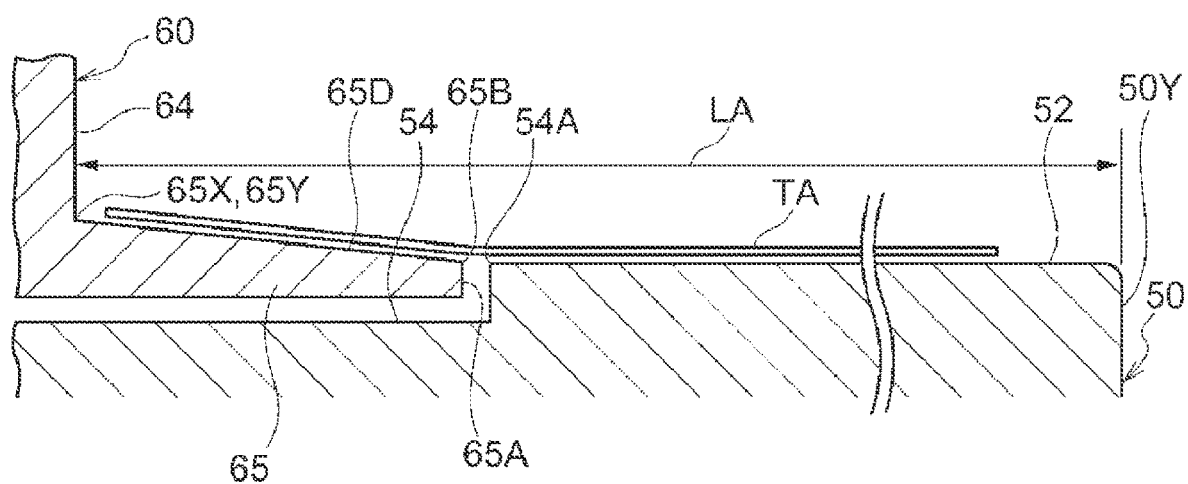

PROCESSING APPARATUS INCLUDING A MOUNT ON WHICH AN OBJECT IS PLACED, AND IMAGE FORMING APPARATUS

CROSS-REFERENCE TO RELATED APPLICATIONS

This application is based on and claims priority under 35 USC 119 from Japanese Patent Application No. 2022-060845, filed on Mar. 31, 2022, the entire disclosure of which is incorporated by reference herein.

BACKGROUND

(i) Technical Field

The present disclosure relates to a processing apparatus and an image forming apparatus.

(ii) Related Art

Japanese Unexamined Patent Application Publication No. 2016-52457 describes a collapsible container including plural mounting parts including an upper mounting part and a lower mounting part that vertically face each other, plural support parts that support the upper mounting part, and connecting parts that connect the support parts to the lower mounting part. Each mounting part includes plural engagement connectors engaged with and connected to the connecting parts at respective locations on a peripheral portion of the mounting part. Each support part includes plural support members that are vertically connected to each other. Each connecting part includes a support connection engagement portion at the top, a main insertion engagement portion at the bottom, and connecting leg portions provided between the support connection engagement portion and the main insertion engagement portion. The support connection engagement portion is connected to and engaged with the corresponding support part. The main insertion engagement portion is inserted into and engaged with a main engagement connection portion of the corresponding engagement connector. The connecting leg portions connect the peripheral portion of the mounting part and the support part so as to form a continuous surface. The connecting leg portions project in two directions along the peripheral portion of the mounting part and include auxiliary insertion engagement portions at the bottom, the auxiliary insertion engagement portions being inserted into and engaged with auxiliary engagement connection portions of the engagement connector.

Japanese Unexamined Patent Application Publication No. 2018-155260 describes a joint for a pipe material characterized by (1) to (3).

(1) The joint includes insertion portions to be inserted into hollow spaces of pipes through openings at ends of the pipes, and is formed by joining at least two joint pieces that are substantially divided from each other along a plane including axes of the insertion portions. Each joint piece includes a bearing cylinder that projects inward from an inner surface of the joint piece at the center of a single axis that extends through the insertion portions or at an intersection of the axes of the insertion portions. Each joint piece has a through hole at which the bearing cylinder opens to the outside and that serves as a hole for receiving a tool, such as a hexagonal wrench. A disc-shaped rotating body is rotatably supported by the bearing cylinders of the joint pieces that are assembled together.

(2) Push rods having inner ends connected to the disc-shaped rotating body are arranged to extend along the axes of the insertion portions, and are movable back and forth along the axes while tapered portions formed at distal ends of the push rods are in contact with tapered-portion-receiving surfaces formed on the inner surfaces of the insertion portions.

(3) A rotating tool, such as an Allen wrench, is inserted through the through hole from the outside, and the disc-shaped rotating body is rotated with the rotating tool to advance or retract the push rods. Thus, the tapered portions of the push rods are advanced along the tapered-portion-receiving surfaces to expand the diameters of the insertion portions, so that the outer peripheral surfaces of the insertion portions are pressed against the inner peripheral surfaces of the pipes to connect the pipes. Alternatively, the disc-shaped rotating body is rotated in a reverse direction so that the tapered portions are retracted along the tapered-portion-receiving surfaces to reduce the diameters of the insertion portions, so that the pressing force is reduced to release the pipes from the joint.

SUMMARY

An example of a processing apparatus includes a mount on which an object is placed and a support member that is provided on an upper surface of the mount and that supports a supported unit that provides at least one of an operation and a display regarding a process, the support member including a protruding portion that protrudes outward at a lower end of the support member and having a rod shape formed by joining plural members adjacent to each other in a direction along the upper surface. In this processing apparatus, when the protruding portion is placed on the upper surface of the mount, the protruding portion projects upward from the upper surface of the mount.

Aspects of non-limiting embodiments of the present disclosure relate to a structure in which upward projection of the protruding portion of the support member from the upper surface of the mount is less than when the protruding portion of the support member is placed on the upper surface of the mount.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a processing apparatus including a mount on which an object is placed and a support member that is provided on an upper surface of the mount and that supports a supported unit that provides at least one of an operation and a display regarding a process, the support member including a protruding portion that protrudes outward at a lower end of the support member and having a rod shape formed by joining plural members adjacent to each other in a direction along the upper surface, the protruding portion being embedded below the upper surface.

BRIEF DESCRIPTION OF THE DRAWINGS

An exemplary embodiment of the present disclosure will be described in detail based on the following figures, wherein:

FIG. 9 is an enlarged side sectional view of portions of the support member and the mount according to the exemplary embodiment.

DETAILED DESCRIPTION

An exemplary embodiment of the present disclosure will now be described with reference to the drawings.

Image Forming Apparatus 10

Figure 1:
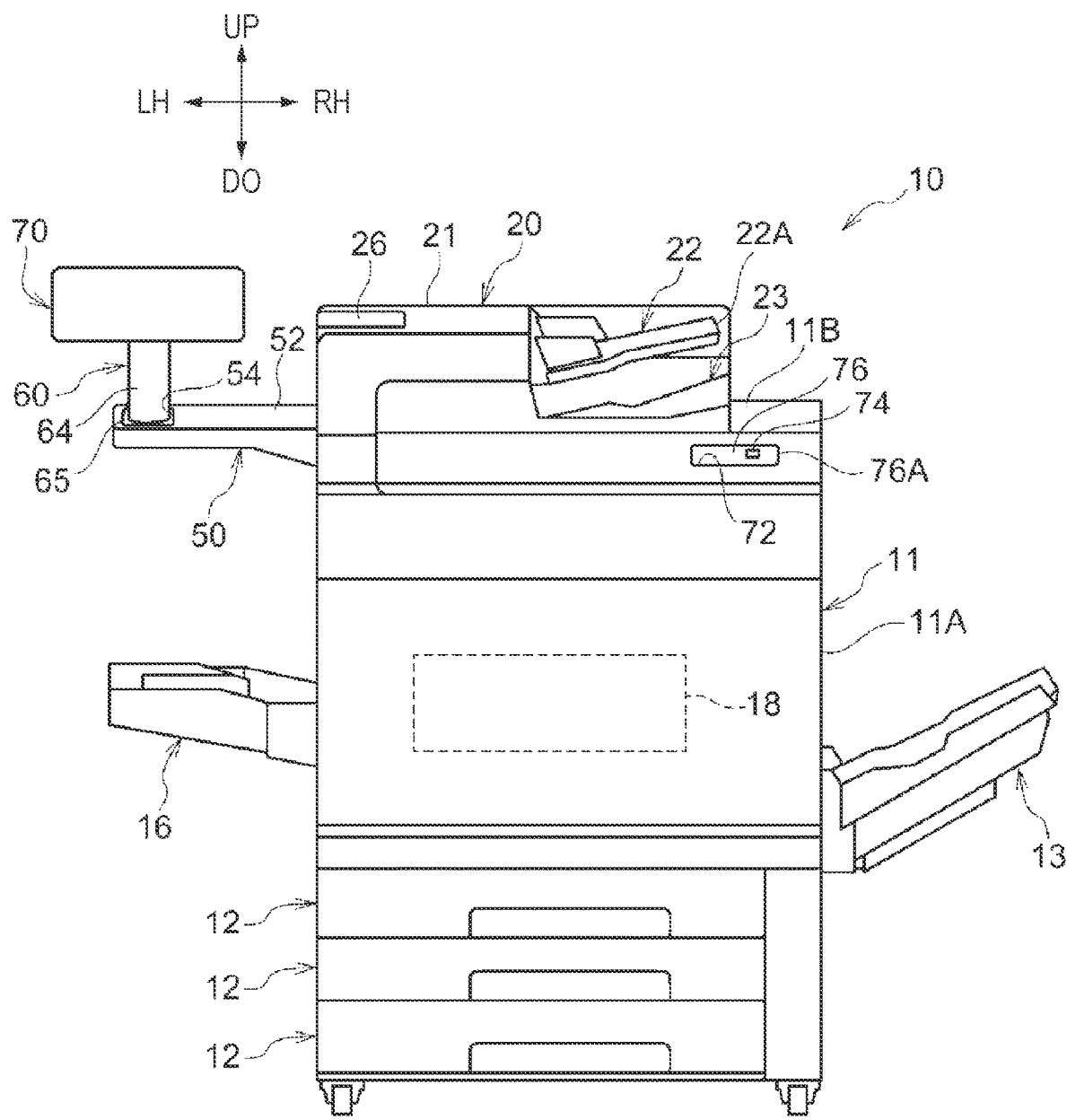
FIG. 1 is a front view of an image forming apparatus according to an exemplary embodiment.
Figure 2:
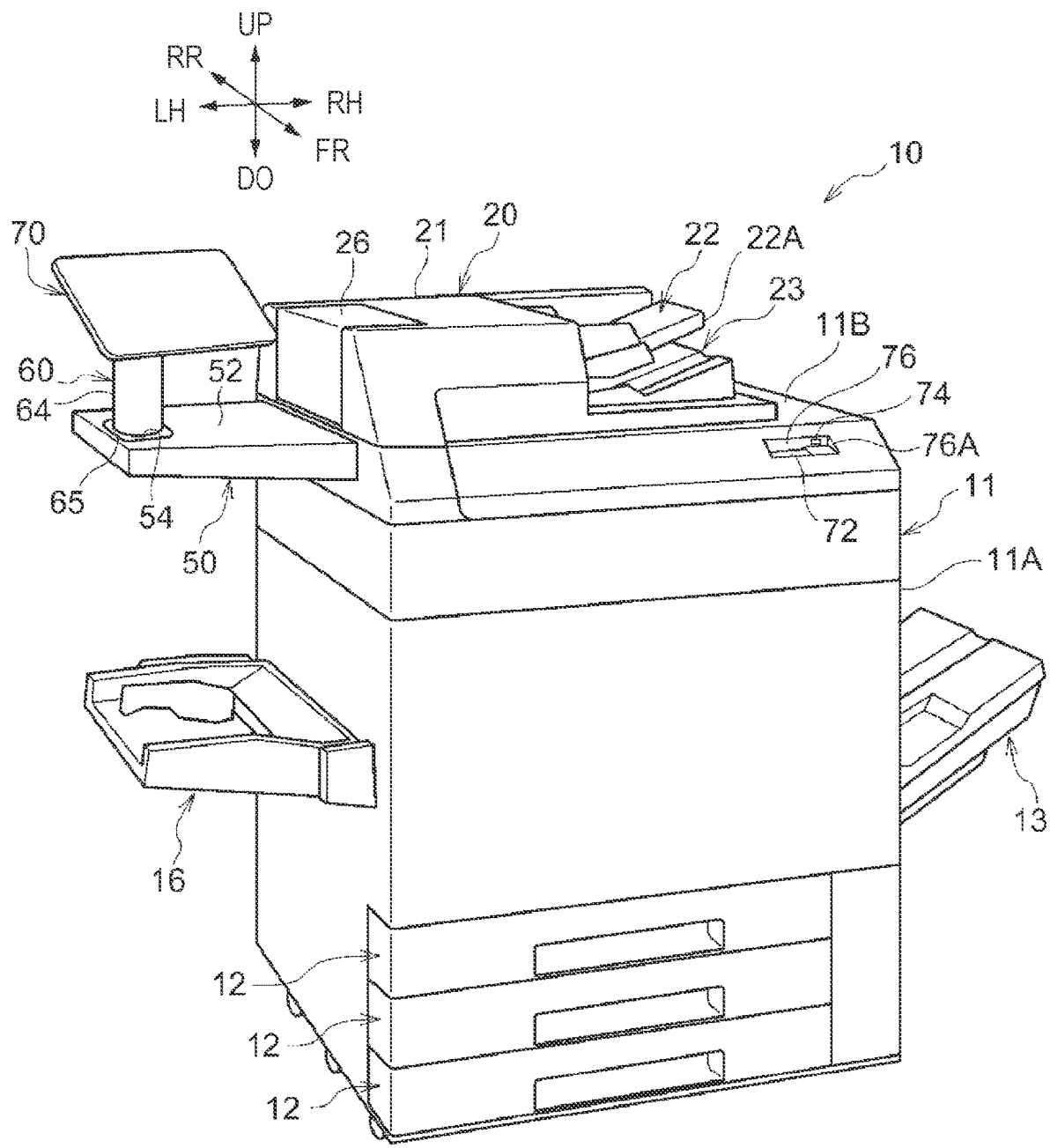
FIG. 2 is a perspective view of the image forming apparatus present according to the exemplary embodiment.

An image forming apparatus 10 according to the present exemplary embodiment will be described. FIG. 1 is a front view of the image forming apparatus 10. FIG. 2 is a perspective view of the image forming apparatus 10.

In the drawings, arrow UP shows an upward (more specifically, vertically upward) direction of the apparatus, and arrow DO shows a downward (more specifically, vertically downward) direction of the apparatus. In addition, arrow LH shows a leftward direction of the apparatus, and arrow RH shows a rightward direction of the apparatus. In addition, arrow FR shows a forward direction of the apparatus, and arrow RR shows a rearward direction of the apparatus. These directions are defined for convenience of description, and the structure of the apparatus is not limited to theses directions. The directions of the apparatus may be referred to without the term "apparatus". For example, the "upward direction of the apparatus" may be referred to simply as the "upward direction".

In addition, in the following description, the term "up-down direction" may be used to mean either "both upward and downward directions" or "one of the upward and downward directions". The term "left-right direction" may be used to mean either "both leftward and rightward directions" or "one of the leftward and rightward directions". The "left-right direction" may also be referred to as a sideways direction, a lateral direction, or a horizontal direction. The term "front-rear direction" may be used to mean either "both forward and rearward directions" or "one of the forward and rearward directions". The "front-rear direction" may also be referred to as a sideways direction, a lateral direction, or a horizontal direction. The up-down direction, the left-right direction, and the front-rear direction cross each other (more specifically, are orthogonal to each other).

In the figures, a circle with an X in the middle represents an arrow going into the page. In addition, a circle with a dot in the middle represents an arrow coming out of the page.

The image forming apparatus 10 illustrated in FIGS. 1 and 2 is an example of a processing apparatus, which performs an image forming process for forming an image. More specifically, as illustrated in FIGS. 1 and 2, the image forming apparatus 10 includes an image forming apparatus body 11, medium storage units 12, a manual feed tray 16, a medium output unit 13, a clip receiver 72, an insertion slot 74, an image forming unit 18, a reading unit 20, a document receiver 22, a document output unit 23, an openable cover 26, a mount 50, a display unit 70, and a support member 60. Components of the image forming apparatus 10 will now be described.

Image Forming Apparatus Body 11

The image forming apparatus body 11 illustrated in FIGS. 1 and 2 is an example of an apparatus body in which structural components of the image forming apparatus 10 are provided. As illustrated in FIGS. 1 and 2, the image forming apparatus body 11 is substantially rectangular-parallelepiped-shaped. More specifically, the image forming apparatus body 11 includes a housing 11A that houses the structural components of the image forming apparatus 10.

Medium Storage Units 12

The medium storage units 12 illustrated in FIGS. 1 and 2 are portions of the image forming apparatus 10 that store recording media. The recording media stored in the medium storage units 12 are supplied to the image forming unit 18. The recording media may be, for example, paper sheets.

Manual Feed Tray 16

The manual feed tray 16 illustrated in FIGS. 1 and 2 is a portion of the image forming apparatus 10 that receives recording media. A tray is a member on which the recording media are stacked. The term "manual feed" refers to an operation in which a user of the image forming apparatus 10 manually places the recording media on the tray. Accordingly, the manual feed tray 16 is a member on which the recording media are manually placed by the user of the image forming apparatus 10.

As described above, the manual feed tray 16 is provided on the exterior (more specifically, on the left side) of the image forming apparatus body 11, and is pivotable about the bottom thereof to be opened and closed with respect to the image forming apparatus body 11. In FIGS. 1 and 2, the manual feed tray 16 is open with respect to the image forming apparatus body 11.

The recording media are placed on the manual feed tray 16 while the manual feed tray 16 is open with respect to the image forming apparatus body 11. The recording media placed on the manual feed tray 16 may be, for example, types of recording media that cannot be fed from the medium storage units 12 or that are not suitable to be fed from the medium storage units 12. Examples of such types of recording media include cardboards, postcards, envelopes, non-standard sized paper sheets, and resin films.

Medium Output Unit 13

The medium output unit 13 illustrated in FIGS. 1 and 2 is an example of an output unit to which a recording medium is output after an image is formed thereon in the image forming apparatus 10. The medium output unit 13 is provided on the exterior (more specifically, on the right side) of the image forming apparatus body 11. A recording medium on which an image has been formed by the image forming unit 18 is output from the image forming apparatus body 11 to the medium output unit 13.

Clip Receiver 72 and Insertion Slot 74

Figure 3:
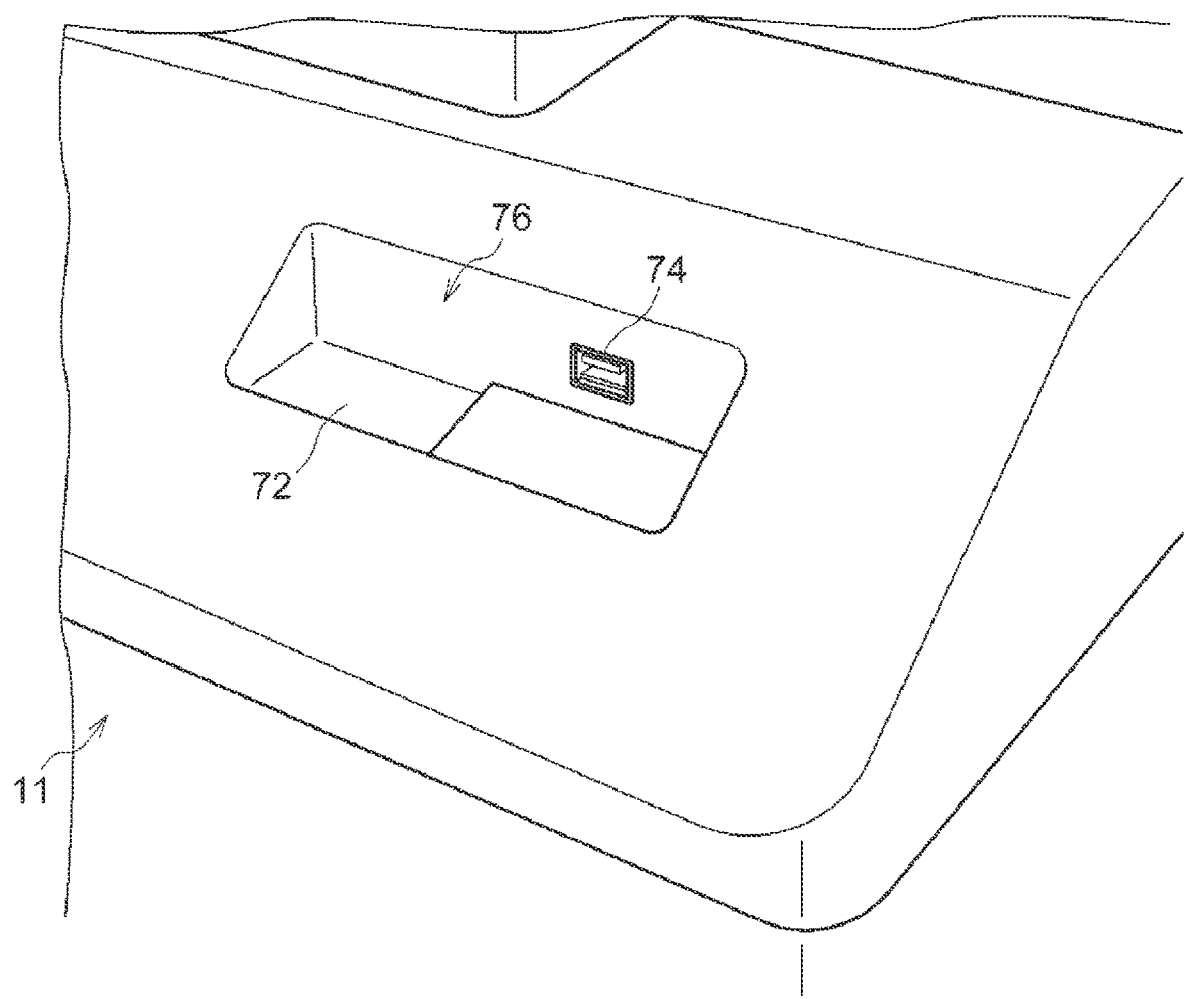
FIG. 3 is a perspective view of a clip receiver and an insertion slot according to the exemplary embodiment.

The clip receiver 72 illustrated in FIG. 3 is a portion of the image forming apparatus 10 that receives a clip. The insertion slot 74 illustrated in FIG. 3 is a slot into which a terminal (more specifically, for example, a USB terminal) is inserted.

As illustrated in FIG. 3, the clip receiver 72 and the insertion slot 74 are arranged next to each other in the left-right direction in one recess 76. More specifically, the insertion slot 74 is disposed on the right side of the clip receiver 72 in the recess 76. The recess 76 is formed in the image forming apparatus body 11. More specifically, the recess 76 is formed in an upper front portion of the image forming apparatus body 11.

The clip receiver 72 is used, for example, to temporarily hold a clip that binds document sheets together. Accordingly, the user may, for example, perform the following operation. That is, the user places the document sheets on the document receiver 22 after removing the clip binding the document sheets together and placing the clip on the clip receiver 72, executes an image reading operation, and then picks up the clip from the clip receiver 72 and binds the document sheets together again after the image reading operation is completed.

Image Forming Unit 18

The image forming unit 18 illustrated in FIG. 1 has a function of forming an image on a recording medium. The image forming unit 18 is, for example, an inkjet image forming unit that forms an image on a recording medium with ink or an electrophotographic image forming unit that forms an image on a recording medium with toner.

The inkjet image forming unit, for example, forms an image on a recording medium by ejecting ink droplets from an ejection unit toward the recording medium. Alternatively, the inkjet image forming unit may form an image on a recording medium by ejecting ink droplets from an ejection unit toward a transfer body and transferring the ink droplets from the transfer body to the recording medium.

The electrophotographic image forming unit, for example, forms an image on a recording medium by performing charging, exposure, developing, and transfer processes. Alternatively, the electrophotographic image forming unit may form an image on a recording medium by performing charging, exposure, developing, and transfer processes to form an image on a transfer body and transferring the image from the transfer body to the recording medium.

Examples of the image forming unit are not limited to the above-described inkjet image forming unit and the above-described electrophotographic image forming unit, and also include various other image forming units.

Reading Unit 20

The reading unit 20 illustrated in FIGS. 1 and 2 has a function of reading an image on a document while transporting the document in the image forming apparatus 10. As illustrated in FIGS. 1 and 2, the reading unit 20 is disposed above the image forming apparatus body 11. More specifically, the reading unit 20 opens and closes with respect to the image forming apparatus body 11 by pivoting about a lower rear portion thereof. FIGS. 1 and 2 illustrate the reading unit 20 that is closed with respect to the image forming apparatus body 11.

More specifically, the reading unit 20 includes a housing 21, a reading device (not illustrated), and a transport mechanism (not illustrated). The reading unit 20 causes the transport mechanism to transport the document supplied from the document receiver 22, and causes the reading device to read the image on the document. The reading device may be, for example, a contact image sensor (CIS).

Document Receiver 22

The document receiver 22 illustrated in FIGS. 1 and 2 is a portion of the image forming apparatus 10 that receives the document. As illustrated in FIGS. 1 and 2, the document receiver 22 is provided on the reading unit 20. More specifically, the document receiver 22 is disposed on a right portion of the housing 21 of the reading unit 20. The document placed on the document receiver 22 is supplied to the reading unit 20. The document may be, for example, a paper sheet.

Document Output Unit 23

The document output unit 23 illustrated in FIGS. 1 and 2 is a portion of the image forming apparatus 10 to which the document is output. The document is output to the document output unit 23 after the image on the document is read by the reading unit 20.

Openable Cover 26

Figure 4:
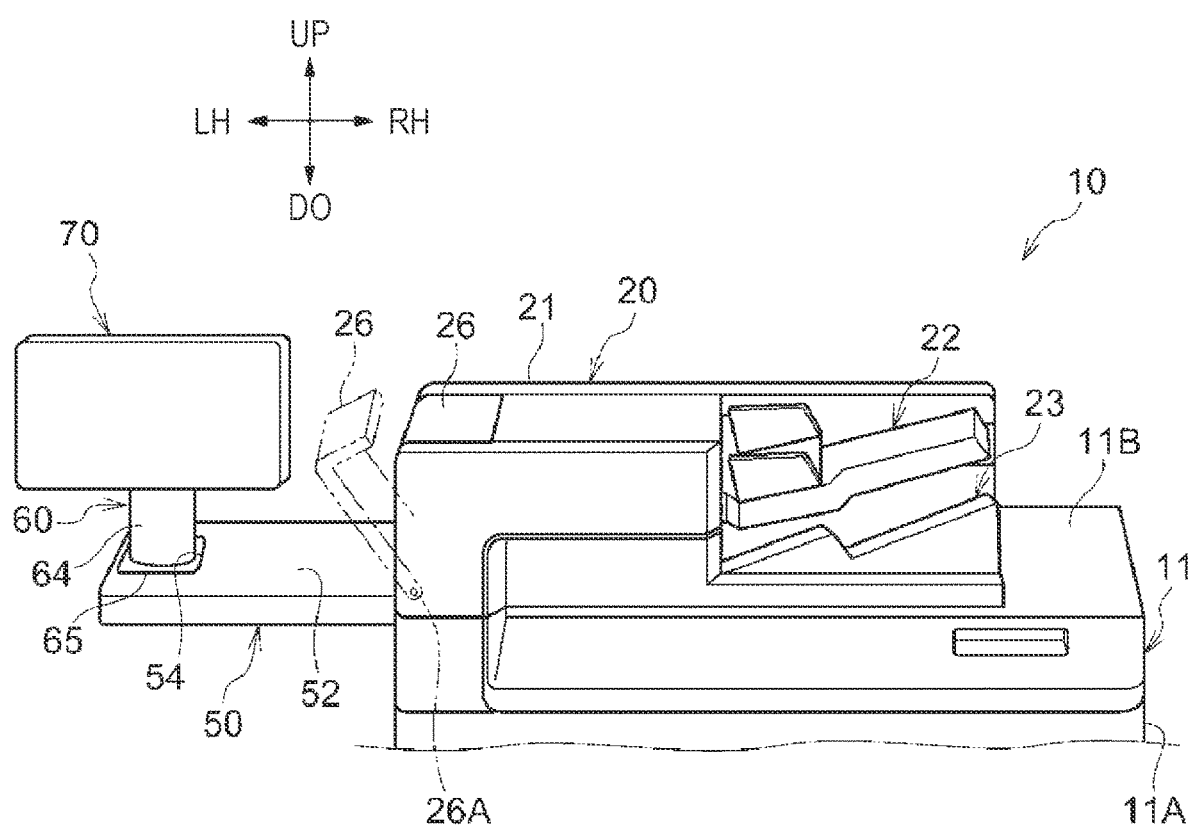
FIG. 4 is a perspective view illustrating the positional relationship between a support member, a display unit, and an openable cover according to the exemplary embodiment.

The openable cover 26 illustrated in FIGS. 1 and 2 is an example of an openable portion, and is provided on the reading unit 20. Referring to FIG. 4, the openable cover 26 opens by moving toward a support member 60 described below (that is, leftward). More specifically, as illustrated in FIG. 4, the openable cover 26 opens by rotating toward the support member 60 about a shaft 26A provided on a portion of the reading unit 20 at a first side (more specifically, the left side).

The openable cover 26 is provided on the reading unit 20 such that the openable cover 26 is rotatable between a closed position (position shown by the solid lines in FIG. 4) and an open position (position shown by the two-dot chain lines in FIG. 4). The openable cover 26 comes into contact with a restraining portion (not illustrated) at the open position, and is thereby restrained from moving toward the support member 60 (that is, leftward) beyond the open position. In other words, an opening angle (rotational angle) of the openable cover 26 is limited.

In the present exemplary embodiment, when the openable cover 26 is open, a transport path (not illustrated) along which the document is transported in the reading unit 20 is exposed to enable removal of the document when the document is jammed in the transport path.

Mount 50

Figure 5:
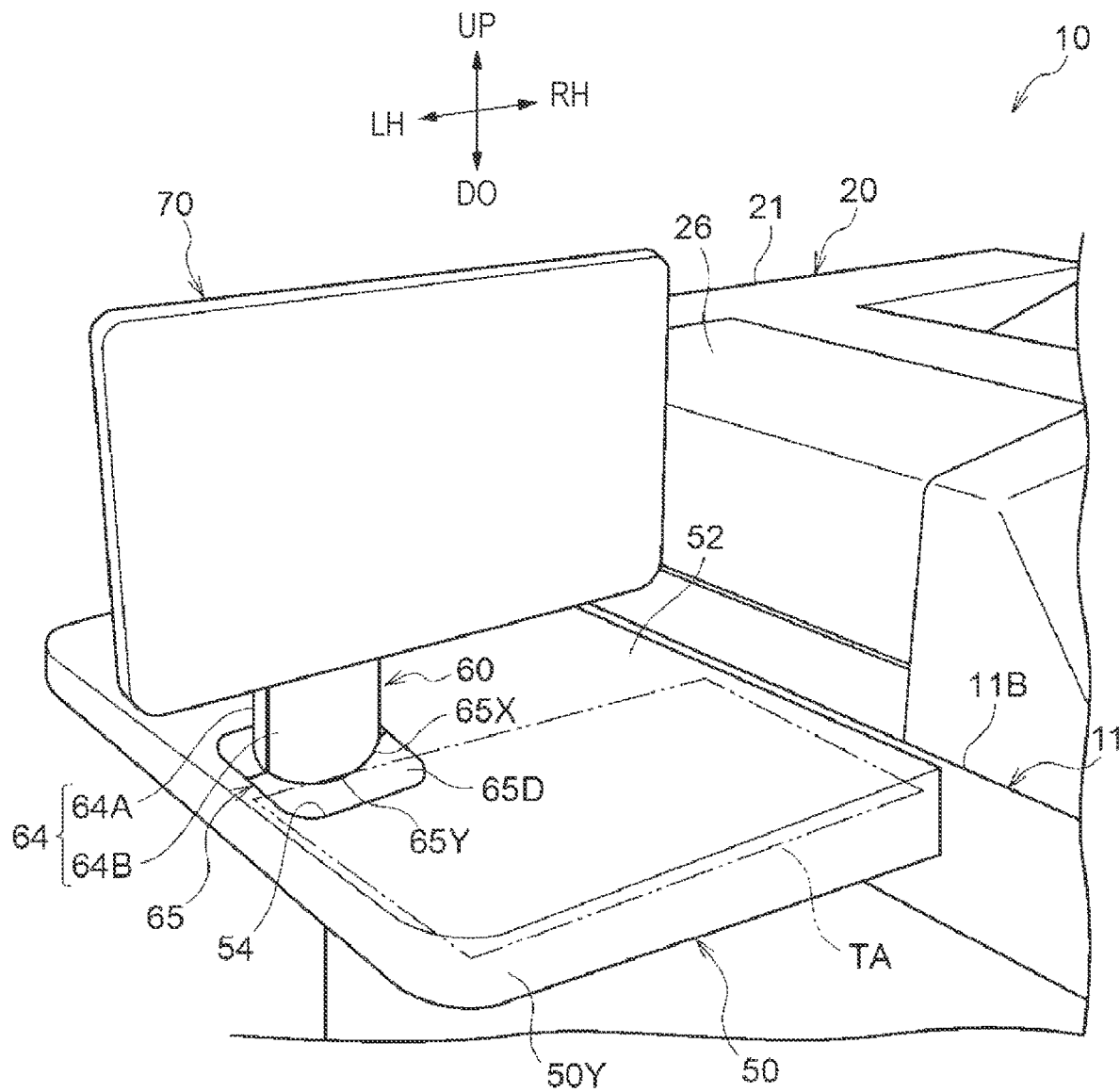
FIG. 5 is a perspective view of a mount, the support member, and the display unit according to the exemplary embodiment.

The mount 50 illustrated in FIG. 5 and other figures has a function of receiving an object TA. The mount 50 has an upper surface 52 that serves as a mounting surface on which the object TA is placed.

When the user uses the image forming apparatus 10, the user may temporarily place an object that is not used on the mount 50 as the object TA. For example, when the user has plural document sheets including one or more document sheets with an image to be read by the reading unit 20, the user may temporarily place the document sheets other than those to be read on the mount 50 as the object TA.

The mount 50 is disposed on the first side (more specifically, the left side) of the image forming apparatus body 11 in the left-right direction. More specifically, as illustrated in FIG. 5, the mount 50 projects leftward from the left side surface of an upper portion of the image forming apparatus body 11 so that the upper surface 52 extends along an upper surface 11B of the image forming apparatus body 11. The mount 50 is disposed above the manual feed tray 16 (see FIG. 1).

As illustrated in FIG. 5, the upper surface 52 of the mount 50 has a recess 54 in which the support member 60 is disposed. The support member 60 is attached to the mount 50 in the recess 54 in the mount 50.

Display Unit 70

The display unit 70 illustrated in FIG. 5 and other figures is an example of a supported unit that provides at least one of an operation and a display regarding a process. The display unit 70 has a function of displaying an operation screen and various messages, such as operation instructions, regarding the image forming process. More specifically, the display unit 70 may be, for example, a liquid crystal display or an organic electro-luminescence (EL) display.

In the present exemplary embodiment, the display unit 70 functions as an operation unit on which the user performs an input operation. More specifically, the display unit 70 is composed of a touch panel display having both a display function and an operation function. The touch panel display is a touch panel of a resistive film type or an electrostatic capacitance type, and detects a touch operation performed by the user.

Thus, the display unit 70 is a structural component that provides both an operation and a display regarding a process (more specifically, the image forming process).

Support Member 60

The support member 60 illustrated in FIG. 5 and other figures is a member that supports the display unit 70. The support member 60 is provided on the upper surface 52 of the mount 50, and extends upward from the upper surface 52.

Figure 6:
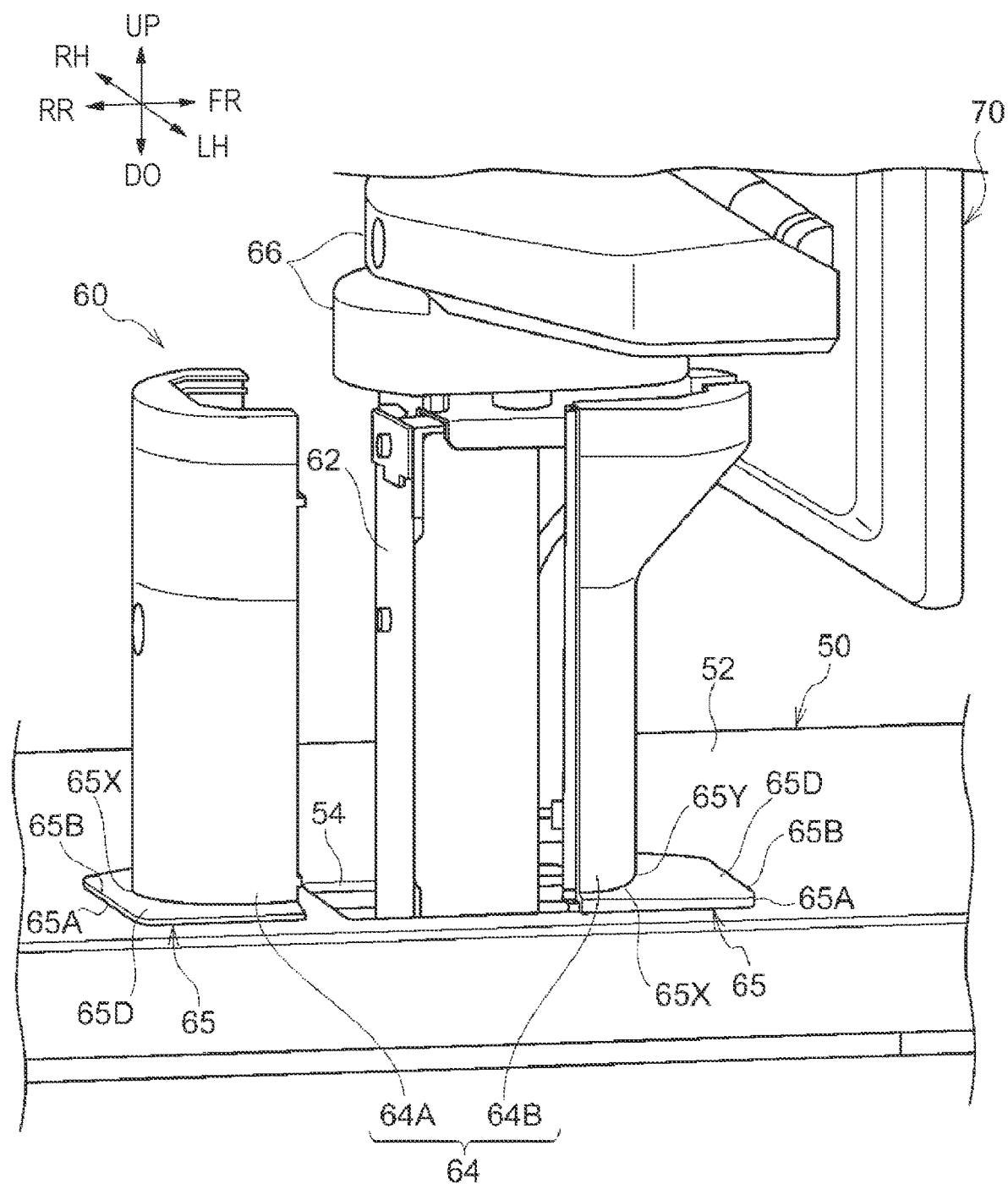
FIG. 6 is a perspective view of the support member according to the exemplary embodiment.

As illustrated in FIG. 6, the support member 60 includes a shaft 62, a cover 64, and a hinge 66. The shaft 62 is rod-shaped and extends upward from the mount 50. The shaft 62 supports the load of the display unit 70 with the hinge 66 disposed between the shaft 62 and the display unit 70.

The hinge 66 functions as a mechanism that enables movement of the display unit 70. The hinge 66 enables the display unit 70 to change its orientation in the left-right direction and the up-down direction within predetermined angular ranges.

The cover 64 is a member that covers the outer periphery of the shaft 62. The cover 64 is tubular (more specifically, cylindrical). The cover 64 includes a protruding portion 65 that protrudes outward at the lower end thereof. The protruding portion 65 protrudes radially outward from the cover 64 along the circumferential direction of the cover 64. More specifically, the protruding portion 65 protrudes in the front-rear direction and the left-right direction from the lower end of the cover 64. The protruding portion 65 has a rectangular shape with rounded corners in plan view.

Referring to FIGS. 5, 6, 7, and 8, the cover 64 is formed in a rod shape by joining members 64A and 64B adjacent to each other in a direction along the upper surface 52 of the mount 50 (more specifically, the circumferential direction along the circumference of the shaft 62). The members 64A and 64B may be regarded as members that face each other in a direction along the upper surface 52 of the mount 50 (more specifically, the front-rear direction).

Figure 7:
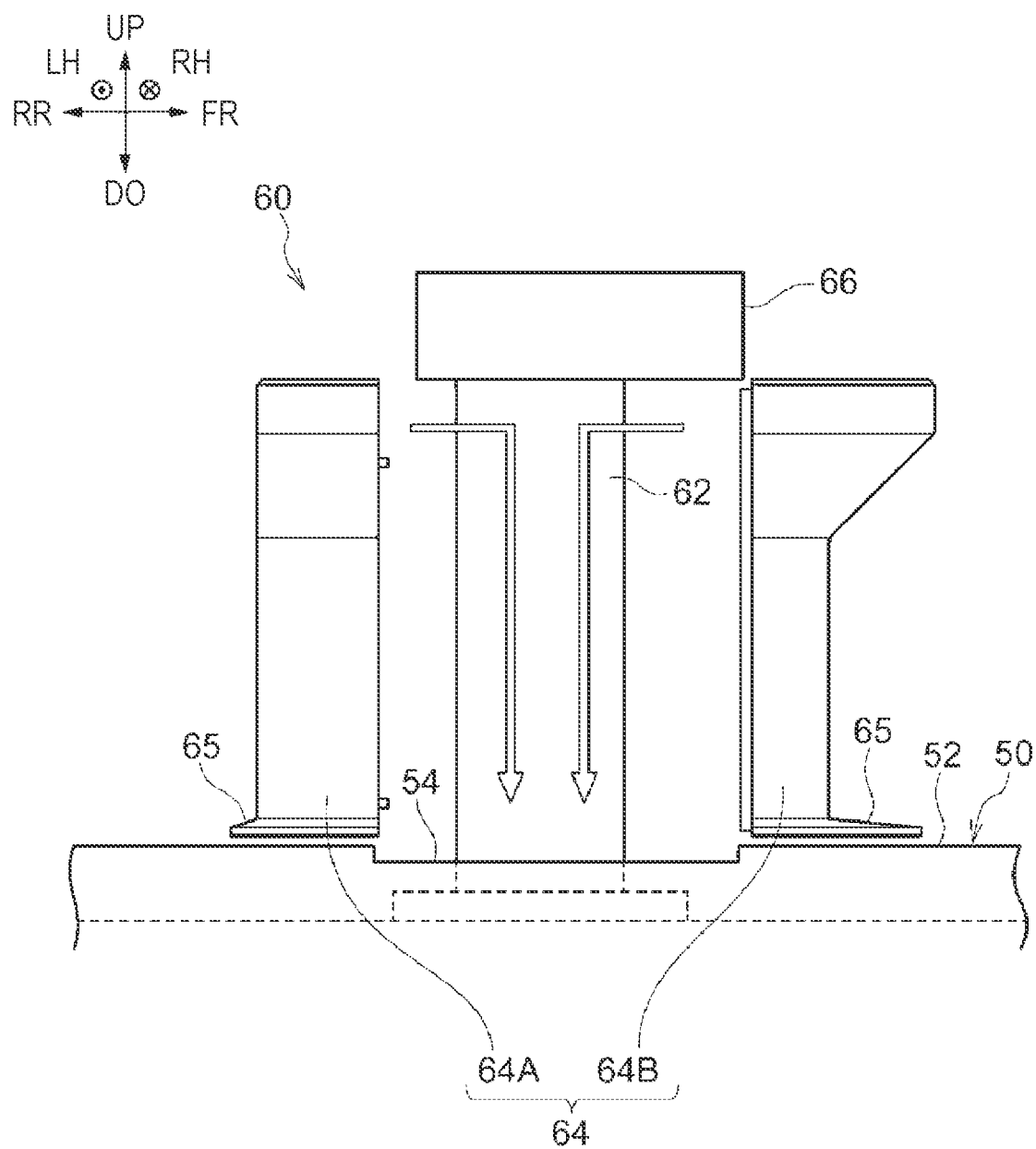
FIG. 7 is a side view illustrating a process of joining a cover of the support member in the exemplary embodiment.
Figure 8:
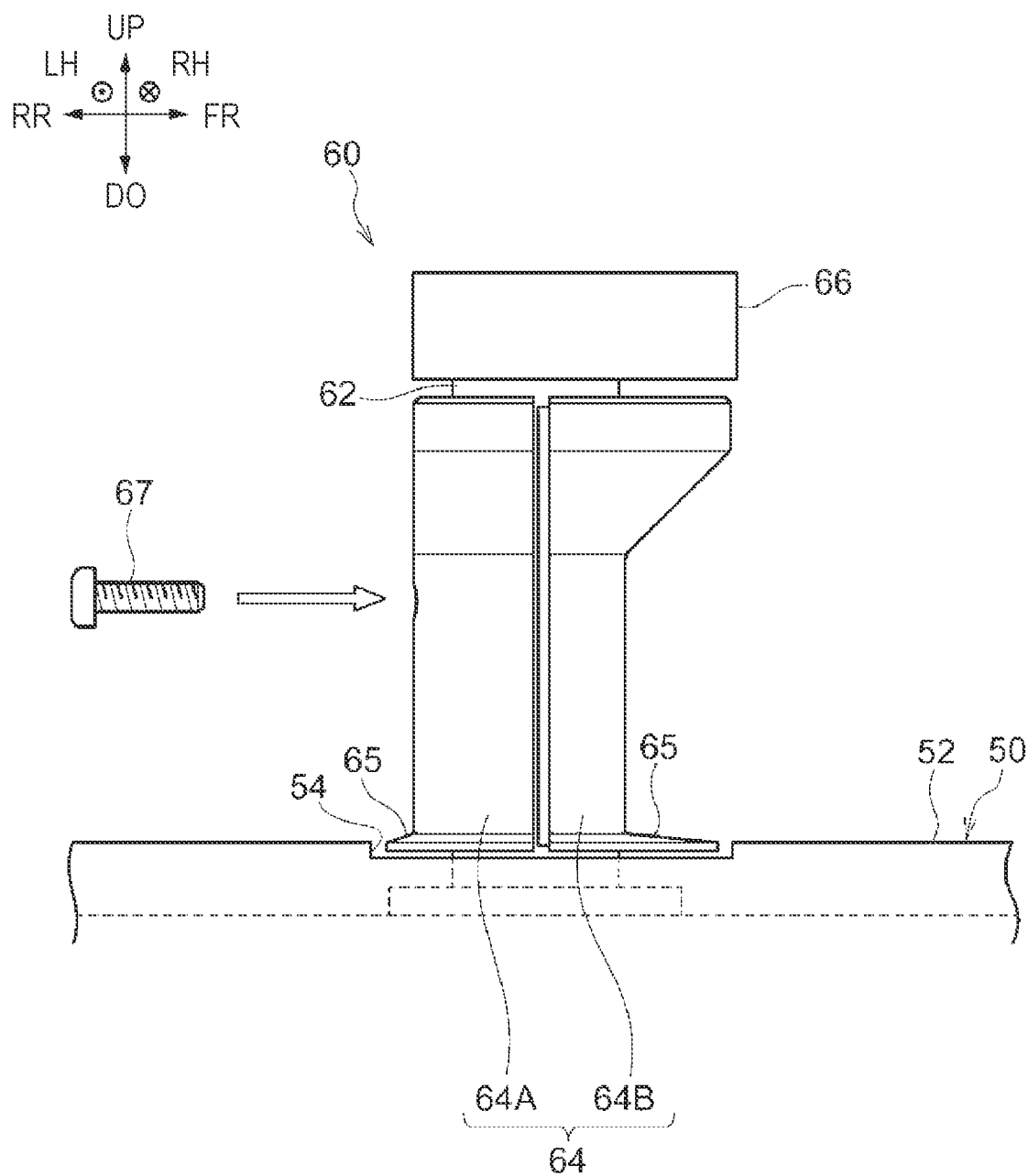
FIG. 8 is a side view illustrating the process of joining the cover of the support member in the exemplary embodiment.

Referring to FIGS. 7 and 8, the members 64A and 64B are attached to the mount 50 by being joined together in a direction along the upper surface 52 of the mount 50 (more specifically, the front-rear direction) and then moved downward in the recess 54 in the mount 50. The members 64A and 64B are fixed to the shaft 62 by a fixing member 67, such as a screw.

As described above, the members 64A and 64B are attached to the mount 50 by being joined together and then moved downward so that, as illustrated in FIGS. 8 and 9, the protruding portion 65 is embedded below the upper surface 52 of the mount 50. It is not necessary that the protruding portion 65 be entirely disposed below the upper surface 52 of the mount 50 as long as the protruding portion 65 is at least partially positioned below the upper surface of the mount 50.

As illustrated in FIG. 9, an upper edge 65B of an outer peripheral portion 65A of the protruding portion 65 is positioned at or below the height of the upper surface 52 of the mount 50 (more specifically, an upper edge 54A of the recess 54). More specifically, the height of the upper edge 65B is even with the height of the upper surface 52 of the mount 50. It is not necessary that the height of the upper edge 65B and the height of the upper surface 52 of the mount 50 be exactly equal to each other, and an error of, for example, about ±3 mm is tolerable.

The protruding portion 65 has an upper surface 65D that is inclined downward from an inner peripheral portion 65X (that is, the base of the support member 60) toward the outer peripheral portion 65A. Therefore, the inner peripheral portion 65X is positioned above the upper edge 65B of the outer peripheral portion 65A. As illustrated in FIGS. 5 and 9, the upper surface 65D of the protruding portion 65 serves as a mounting surface for receiving the object TA together with the upper surface 52 of the mount 50. The upper surface 65D of the protruding portion 65 may have a small inclination so that the object TA placed thereon does not easily slip outward from the protruding portion 65.

A distance LA (see FIG. 9) from a front end 65Y of the inner peripheral portion 65X of the protruding portion 65 to a front end 50Y of the mount 50 is greater than ½ of the minimum width of a sheet size most frequently used in the image forming apparatus 10 (more specifically, A4 size). The distance LA may be ¾ or more of the minimum width of the sheet size (more specifically, A4 size).

Positional Relationship Between Components of Image Forming Apparatus 10

The positional relationship between the support member 60, the display unit 70, and the openable cover 26 will now be described.

The support member 60 (more specifically, the cover 64) and the display unit 70 are disposed on the mount 50 at a position such that the openable cover 26 in an open state does not interfere therewith (see FIG. 4). The support member 60 and the display unit 70 are positioned so that the openable cover 26 in the open state does not interfere therewith over the entire range in which the display unit 70 is movable about the hinge 66. Therefore, the support member 60 and the display unit 70 are positioned so that the openable cover 26 in the open state does not interfere therewith when the display unit 70 faces forward.

In the present exemplary embodiment, the opening angle (rotational angle) of the openable cover 26 is limited so that the support member 60 (more specifically, the cover 64) and the display unit 70 are disposed on the mount 50 at a position where the openable cover 26 in the open state does not interfere therewith. In this structure, the distance from the rotation center of the openable cover 26 to a portion of the support member 60 or the display unit 70 closest to the rotation center is less than the distance from the rotation center to a portion of the openable cover 26 farthest from the rotation center.

The positional relationship between the reading unit 20, the display unit 70, the document receiver 22, the clip receiver 72, the recess 76 in which the clip receiver 72 is disposed, and the medium output unit 13 will now be described (see FIGS. 1 and 2).

As illustrated in FIGS. 1 and 2, the display unit 70 is disposed on the first side (more specifically, the left side) of the reading unit 20 in the left-right direction. The document receiver 22 is provided on a portion of the reading unit 20 at a second side (more specifically, the right side) in the left-right direction.

The clip receiver 72 is provided on the image forming apparatus body 11 at a position on the second side (more specifically, the right side) of the document receiver 22. The medium output unit 13 is provided on the image forming apparatus body 11 at a position on the second side (more specifically, the right side) of the clip receiver 72.

The recess 76 in which the clip receiver 72 and the insertion slot 74 are provided is disposed such that an end portion thereof at the second side (more specifically, the right end portion) 76A is disposed on the second side (more specifically, the right side) of an end portion of the document receiver 22 at the second side (more specifically, the right end portion) 22A.

In addition, in the present exemplary embodiment, the display unit 70 is disposed on the first side (more specifically, the left side) of the insertion slot 74 in the left-right direction, and the medium output unit 13 is disposed on the second side (more specifically, the right side) of the insertion slot 74 in the left-right direction. In other words, the display unit 70, the insertion slot 74, and the medium output unit 13 are arranged in the left-right direction from the first side (more specifically, the left side) toward the second side (more specifically, the right side).

The components of the image forming apparatus 10 may instead be arranged assuming that the first side in the left-right direction is the right side and the second side in the left-right direction is the left side.

Operation of Present Exemplary Embodiment

In the present exemplary embodiment, as illustrated in FIGS. 8 and 9, the protruding portion 65 of the support member 60 is embedded below the upper surface 52 of the mount 50.

In addition, in the present exemplary embodiment, as illustrated in FIG. 9, the upper edge 65B of the outer peripheral portion 65A of the protruding portion 65 is positioned at or below the height of the upper surface 52 of the mount 50 (more specifically, the upper edge 54A of the recess 54).

More specifically, in the present exemplary embodiment, the height of the upper edge 65B is even with the height of the upper surface 52 of the mount 50.

In addition, in the present exemplary embodiment, the support member 60 (more specifically, the cover 64) is disposed on the mount 50 at a position such that the openable cover 26 in the open state does not interfere therewith (see FIG. 4).

In addition, in the present exemplary embodiment, as illustrated in FIG. 4, the openable cover 26 opens by rotating toward the support member 60 about the shaft 26A provided on the first side (more specifically, the left side) of the reading unit 20.

In addition, in the present exemplary embodiment, the display unit 70 is disposed on the mount 50 at a position such that the openable cover 26 in the open state does not interfere therewith (see FIG. 4).

In addition, in the present exemplary embodiment, the distance LA (see FIG. 9) from the front end 65Y of the inner peripheral portion 65X of the protruding portion 65 to the front end 50Y of the mount 50 is greater than ½ of the minimum width of the sheet size most frequently used in the image forming apparatus 10 (more specifically, A4 size).

More specifically, in the present exemplary embodiment, the distance LA may be ¾ or more of the minimum width of the sheet size (more specifically, A4 size).

In addition, in the present exemplary embodiment, the clip receiver 72 is provided on the image forming apparatus body 11 at a position on the second side (more specifically, the right side) of the document receiver 22 in the left-right direction.

In addition, in the present exemplary embodiment, the recess 76 in which the clip receiver 72 and the insertion slot 74 are provided is disposed such that the end portion thereof at the second side (more specifically, the right end portion) 76A is on the second side (more specifically, the right side) of the end portion of the document receiver 22 at the second side (more specifically, the right end portion) 22A.

In addition, in the present exemplary embodiment, as illustrated in FIG. 3, the clip receiver 72 and the insertion slot 74 are arranged next to each other in the left-right direction in one recess 76.

In addition, in the present exemplary embodiment, the display unit 70, the insertion slot 74, and the medium output unit 13 are arranged in the left-right direction from the first side (more specifically, the left side) toward the second side (more specifically, the right side).

Modifications of Image Forming Apparatus 10

Although the image forming apparatus 10 is described as an example of the processing apparatus in the present exemplary embodiment, the processing apparatus is not limited to this. For example, the processing apparatus may be a device that performs a medical process (for example, an image display for medical diagnosis). Thus, the process performed by the processing apparatus is not limited to an image forming process, and may be various processes.

Modifications of Openable Cover 26

Although, in the present exemplary embodiment, the openable cover 26 opens by rotating toward the support member 60 about the shaft 26A provided on the first side (more specifically, the left side) of the reading unit 20 as illustrated in FIG. 4, the openable cover 26 is not limited to this. For example, the openable cover 26 may open by moving straight toward the support member 60.

Although, in the present exemplary embodiment, the opening angle (rotational angle) of the openable cover 26 is limited so that the support member 60 (more specifically, the cover 64) and the display unit 70 are disposed on the mount 50 at a position where the openable cover 26 in the open state does not interfere therewith, the openable cover 26 is not limited to this. For example, the distance from the rotation center of the openable cover 26 to a portion of the support member 60 or the display unit 70 closest to the rotation center may be greater than the distance from the rotation center to a portion of the openable cover 26 farthest from the rotation center so that the support member 60 (more specifically, the cover 64) and the display unit 70 are disposed on the mount 50 at a position where the openable cover 26 in the open state does not interfere therewith.

Modifications of Mount 50

Although, in the present exemplary embodiment, the mount 50 is disposed on the left side of the image forming apparatus body 11, the mount 50 is not limited to this. For example, the mount 50 may be disposed on the right side or in front of the image forming apparatus body 11.

Although, in the present exemplary embodiment, the distance LA (see FIG. 9) from the front end 65Y of the inner peripheral portion 65X of the protruding portion 65 to the front end 50Y of the mount 50 is ¾ or more of the minimum width of the sheet size most frequently used in the image forming apparatus 10 (more specifically, A4 size), the distance LA is not limited to this. For example, the distance LA may be less than ¾ of the minimum width of the sheet size most frequently used in the image forming apparatus 10 (more specifically, A4 size). Alternatively, the distance LA may be ½ or less of the minimum width of the sheet size most frequently used in the image forming apparatus 10 (more specifically, A4 size).

Modifications of Support Member 60

Although, in the present exemplary embodiment, the height of the upper edge 65B of the outer peripheral portion 65A of the protruding portion 65 is even with the height of the upper surface 52 of the mount 50, the support member 60 is not limited to this. For example, the upper edge 65B may be positioned above the height of the upper surface 52 of the mount 50 beyond an error range. In addition, the upper edge 65B may be positioned below the height of the upper surface 52 of the mount 50 beyond an error range. The relationship between the height of the upper edge 65B and the height of the upper surface 52 of the mount 50 is not limited as long as the protruding portion 65 is at least partially positioned below the upper surface 52 of the mount 50.

Although, in the present exemplary embodiment, the support member 60 (more specifically, the cover 64) is disposed on the mount 50 at a position such that the openable cover 26 in the open state does not interfere therewith (see FIG. 4), the support member 60 is not limited to this. For example, the support member 60 (more specifically, the cover 64) may be disposed on the mount 50 at a position such that the openable cover 26 in the open state interferes therewith.

Although, in the present exemplary embodiment, the protruding portion 65 has a rectangular shape with rounded corners in plan view, the protruding portion 65 is not limited to this. For example, the protruding portion 65 may have a quadrangular shape other than a rectangular shape, a polygonal shape other than a quadrangular shape, or a circular shape in plan view. In other words, the shape of the protruding portion 65 in plan view is not limited to any specific shape, and may be various shapes.

Although the members 64A and 64B of the cover 64 are joined in the direction along the upper surface 52 of the mount 50 (more specifically, the front-rear direction), the members 64A and 64B are not limited to this. For example, the members 64A and 64B may be joined by being moved relative to each other in the up-down direction, and the direction in which the members 64A and 64B are joined may be various directions.

Although, in the present exemplary embodiment, the cover 64 is composed of the members 64A and 64B, the cover 64 is not limited to this. For example, the cover 64 may be composed of three or more members.

Modifications of Display Unit 70

Although, in the present exemplary embodiment, the display unit 70 serving as an example of the supported unit is a structural component that provides both an operation and a display regarding a process (more specifically, the image forming process), the supported unit is not limited to this. An example of the supported unit may be a structural component that provides one of an operation and a display regarding a process (more specifically, the image forming process). In other words, an example of the supported unit may be any structural component that provides at least one of an operation and a display regarding a process (more specifically, the image forming process).

Although, in the present exemplary embodiment, the display unit 70 is disposed on the mount 50 at a position such that the openable cover 26 in the open state does not interfere therewith (see FIG. 4), the display unit 70 is not limited to this. For example, the display unit 70 may be disposed on the mount 50 at a position such that the openable cover 26 in the open state interferes therewith.

Modifications of Clip Receiver 72 and Other Components

Although, in the present exemplary embodiment, the clip receiver 72 is provided on the image forming apparatus body 11 at a position on the second side (more specifically, the right side) of the document receiver 22 in the left-right direction, the clip receiver 72 is not limited to this. For example, the clip receiver 72 may be provided on the image forming apparatus body 11 at a position on the first side (more specifically, the left side) of the document receiver 22 in the left-right direction.

Although, in the present exemplary embodiment, the recess 76 in which the clip receiver 72 and the insertion slot 74 are provided is disposed such that the end portion thereof at the second side (more specifically, the right end portion) 76A is on the second side (more specifically, the right side) of the end portion of the document receiver 22 at the second side (more specifically, the right end portion) 22A, the recess 76 is not limited to this. For example, the end portion of the recess 76 at the second side (more specifically, the right end portion) 76A may be disposed on the first side (more specifically, the left side) of the end portion of the document receiver 22 at the second side (more specifically, the right end portion) 22A.

The present disclosure is not limited to the above-described exemplary embodiment, and various modifications, alterations, and improvements are possible without departing from the spirit of the present disclosure. For example, the above-described modifications may be applied in combinations with each other as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A processing apparatus comprising:
a mount on which an object is placed;
a support member that is provided on an upper surface of the mount and that supports a supported unit that provides at least one of an operation and a display regarding a process, the support member including a protruding portion that protrudes outward at a lower end of the support member and having a rod shape formed by joining a plurality of members adjacent to each other in a direction along the upper surface, the protruding portion being embedded below the upper surface;
an apparatus body; and
a reading unit that is disposed above the apparatus body and that reads an image on a document while transporting the document,
wherein the mount is disposed on a first side of the apparatus body in a left-right direction,
wherein the reading unit is provided with an openable portion that opens by moving toward the support member, and wherein the support member is disposed on the mount at a position such that the openable portion in an open state does not interfere with the support member.

2. The processing apparatus according to claim 1, wherein an upper edge of an outer peripheral portion of the protruding portion is positioned at or below a height of the upper surface of the mount.

3. The processing apparatus according to claim 2, wherein a height of the upper edge of the outer peripheral portion of the protruding portion is even with the height of the upper surface of the mount.

4. The processing apparatus according to claim 3, wherein the openable portion opens by rotating toward the support member about a shaft provided on a portion of the reading unit at the first side.

5. The processing apparatus according to claim 4, further comprising the supported unit disposed at a position such that the openable portion in the open state does not interfere with the supported unit.

6. The processing apparatus according to claim 3, further comprising the supported unit disposed at a position such that the openable portion in the open state does not interfere with the supported unit.

7. The processing apparatus according to claim 2, wherein the openable portion opens by rotating toward the support member about a shaft provided on a portion of the reading unit at the first side.

8. The processing apparatus according to claim 7, further comprising the supported unit disposed at a position such that the openable portion in the open state does not interfere with the supported unit.

9. The processing apparatus according to claim 2, further comprising the supported unit disposed at a position such that the openable portion in the open state does not interfere with the supported unit.

10. The processing apparatus according to claim 2, wherein a distance from a front end of an inner peripheral portion of the protruding portion to a front end of the mount is greater than ½ of a minimum width of a sheet size most frequently used in the processing apparatus.

11. The processing apparatus according to claim 1, wherein the openable portion opens by rotating toward the support member about a shaft provided on a portion of the reading unit at the first side.

12. The processing apparatus according to claim 11, further comprising the supported unit disposed at a position such that the openable portion in the open state does not interfere with the supported unit.

13. The processing apparatus according to claim 1, further comprising the supported unit disposed at a position such that the openable portion in the open state does not interfere with the supported unit.

14. An image forming apparatus comprising:

an apparatus body;

a reading unit that is disposed above the apparatus body and that reads an image on a document while transporting the document;

a supported unit that is disposed on a first side of the reading unit in a left-right direction;

a document receiver that is provided on a portion of the reading unit at a second side in the left-right direction and that receives the document;

a clip receiver that is provided on the apparatus body at a position on the second side of the document receiver and that receives a clip; and an output unit that is provided on the apparatus body at a position on the second side of the clip receiver and to which a recording medium on which an image is formed is output from the apparatus body, wherein the image forming apparatus serves as the processing apparatus according to claim 1.

15. The image forming apparatus according to claim 14, wherein the image forming apparatus has an insertion slot into which a terminal is inserted, wherein the clip receiver and the insertion slot are arranged next to each other in the left-right direction in one recess, and wherein an end portion of the recess at the second side is disposed on the second side of an end portion of the document receiver at the second side.

16. A processing apparatus comprising:

a mount on which an object is placed; and a support member that is provided on an upper surface of the mount and that supports a supported unit that provides at least one of an operation and a display regarding a process, the support member including a protruding portion that protrudes outward at a lower end of the support member and having a rod shape formed by joining a plurality of members adjacent to each other in a direction along the upper surface, the protruding portion being embedded below the upper surface;

wherein a distance from a front end of an inner peripheral portion of the protruding portion to a front end of the mount is greater than ½ of a minimum width of a sheet size most frequently used in the processing apparatus.

17. The processing apparatus according to claim 16, wherein the distance is ¾ or more of the minimum width of the sheet size.

* * * * *